US012546247B2

(12) United States Patent
Carlén Andersson et al.

(10) Patent No.: US 12,546,247 B2
(45) Date of Patent: Feb. 10, 2026

(54) INTERNAL COMBUSTION ENGINE ARRANGEMENT

(71) Applicant: VOLVO TRUCK CORPORATION, Gothenburg (SE)

(72) Inventors: Johan Carlén Andersson, Lund (SE); Fredrik Rahm, Hörby (SE); Erik Svensson, Malmö (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/802,077

(22) Filed: Aug. 13, 2024

(65) Prior Publication Data

US 2025/0067208 A1 Feb. 27, 2025

(30) Foreign Application Priority Data

Aug. 21, 2023 (EP) ..................................... 23192418

(51) Int. Cl.
| | |
|---|---|
| *F02B 37/12* | (2006.01) |
| *F02B 37/10* | (2006.01) |
| *F02B 37/22* | (2006.01) |
| *F02B 37/24* | (2006.01) |
| *F02B 39/10* | (2006.01) |

(52) U.S. Cl.
CPC .............. *F02B 37/12* (2013.01); *F02B 37/10* (2013.01); *F02B 37/22* (2013.01); *F02B 37/24* (2013.01); *F02B 39/10* (2013.01); *F02B 2037/122* (2013.01)

(58) Field of Classification Search
CPC .......... F02B 37/10; F02B 37/12; F02B 37/22; F02B 37/24; F02B 39/10; F02B 2037/122
See application file for complete search history.

(56) References Cited

U.S. PATENT DOCUMENTS

| | | |
|---|---|---|
| 6,705,084 B2 | 3/2004 | Allen et al. |
| 2013/0004292 A1 | 1/2013 | Sun et al. |
| 2016/0258317 A1* | 9/2016 | Yamada ................ F01D 21/003 |

(Continued)

FOREIGN PATENT DOCUMENTS

DE 10 2019 128255 A1 4/2020

OTHER PUBLICATIONS

Extended European Search Report for European Patent Application No. 23192418.4, mailed Feb. 12, 2024, 11 pages.

*Primary Examiner* — Audrey B. Walter
(74) *Attorney, Agent, or Firm* — Sage Patent Group

(57) ABSTRACT

An internal combustion engine arrangement, comprising an internal combustion engine, a turbo arrangement, comprising a turbine and a compressor, wherein the turbine comprises a flow control member, an electric machine operatively coupled to the turbo arrangement, and a control unit, comprising processing circuitry configured to: determine a current operating parameter of the turbine, determine a current operating parameter of exhaust gas exhausted from the internal combustion engine, and determine a current operating condition of the turbine, and in response to the current operating condition forming part of a predetermined subset of operating conditions: control the electric machine to adjust the rotational speed of the turbo arrangement, and contemporaneously control the flow control member to adjust the swallowing capacity of the turbine.

16 Claims, 6 Drawing Sheets

(56) References Cited

U.S. PATENT DOCUMENTS

| | | | |
|---|---|---|---|
| 2020/0156643 A1* | 5/2020 | Hu | F02D 41/0007 |
| 2020/0224614 A1* | 7/2020 | Hu | F02B 37/10 |
| 2022/0364499 A1 | 11/2022 | Uchanski et al. | |
| 2022/0412250 A1 | 12/2022 | Klingbeil et al. | |
| 2023/0243294 A1 | 8/2023 | Lavertu et al. | |

* cited by examiner

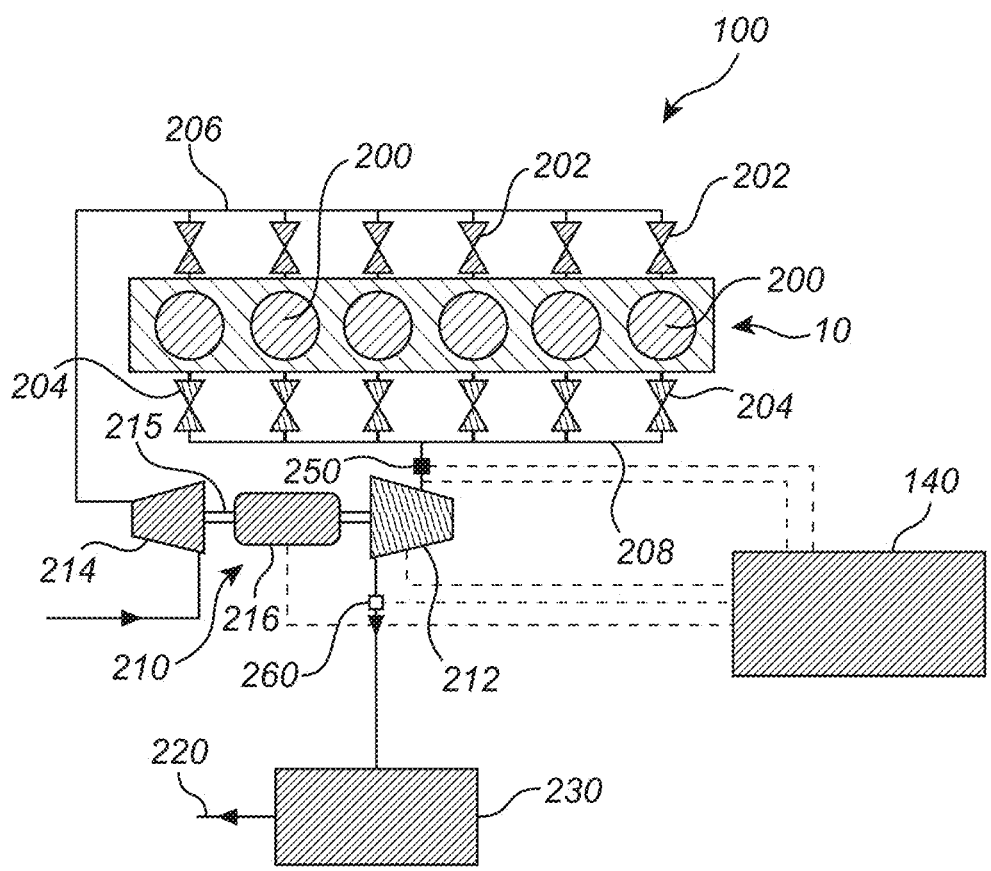
*Fig. 2*
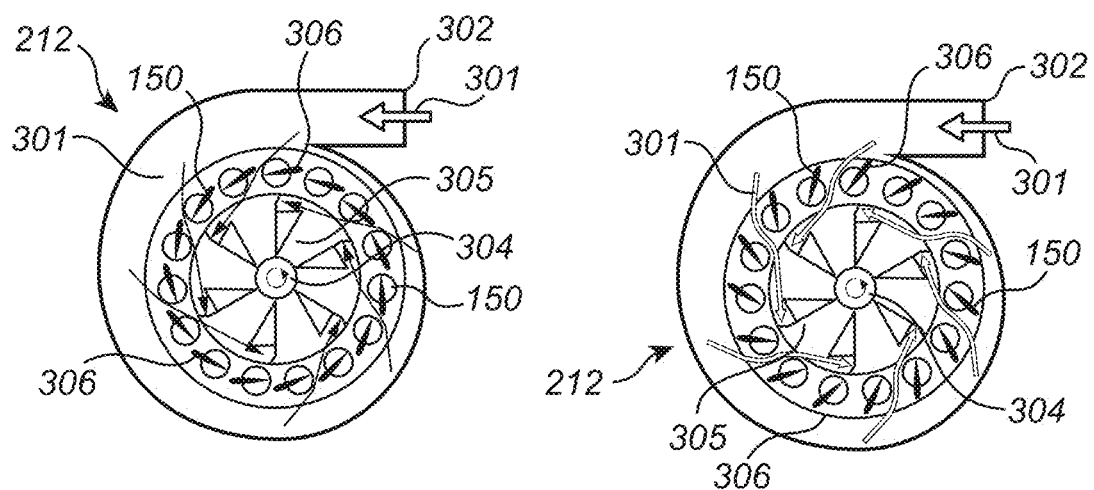
*Fig. 3A*     *Fig. 3B*

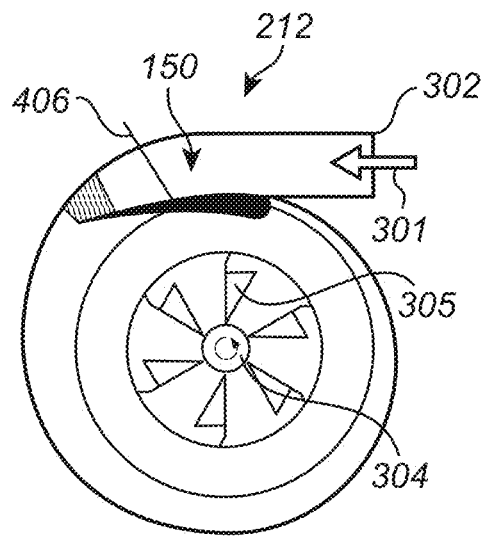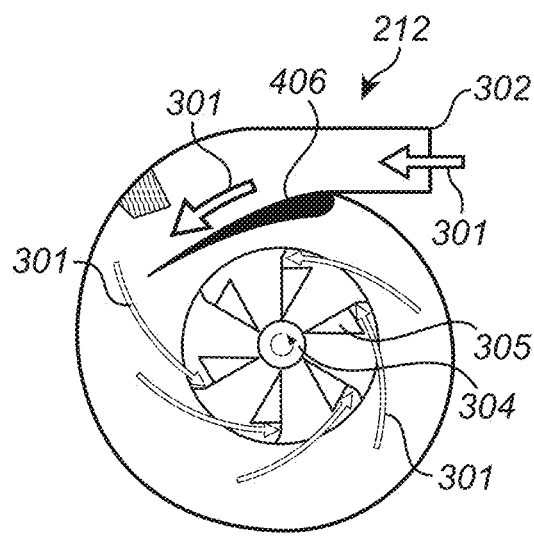
Fig. 4A　　　　　　　　Fig. 4B
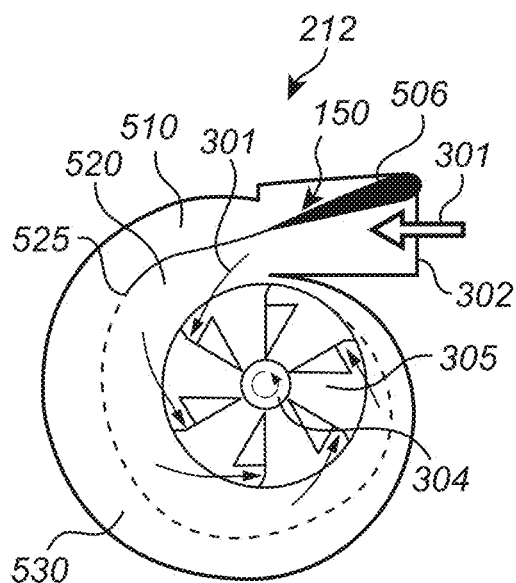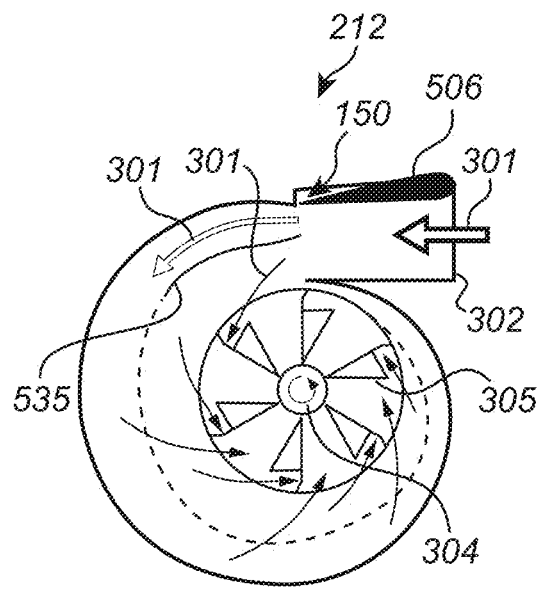
Fig. 5A　　　　　　　　Fig. 5B

INTERNAL COMBUSTION ENGINE ARRANGEMENT

CROSS REFERENCE TO RELATED APPLICATION

This application claims foreign priority to European Application 23192418.4 filed on Aug. 21, 2023, the disclosure and content of which is incorporated by reference herein in its entirety.

TECHNICAL FIELD

The disclosure relates generally to an arrangement and method for avoiding high cycle fatigue. In particular aspects, the disclosure relates to an internal combustion engine arrangement configured to avoid turbine high cycle fatigue. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Internal combustion engines have been conventionally used for propelling vehicles. A conventional internal combustion engine uses petrol or diesel as fuel. Further, using a turbo arrangement in connection to the internal combustion engine is also conventional.

During operation, and e.g. during engine braking, the turbine of the turbo arrangement may be used to control a back pressure. However, an issue with such operating scenario is that the turbine may be exposed to high cycle fatigue loads when aiming at reaching high engine brake power. The turbine may also be exposed to such high cycle fatigue loads during other operating conditions and there is thus a desire to reduce the risk of such high cycle fatigue of the turbine.

SUMMARY

According to a first aspect of the disclosure, there is provided an internal combustion engine arrangement, comprising an internal combustion engine, a turbo arrangement, comprising a turbine arranged in downstream fluid communication with an exhaust manifold of the internal combustion engine, and a compressor mechanically connected to the turbine, the compressor being arranged in upstream fluid communication with an inlet manifold of the internal combustion engine, wherein the turbine comprises a flow control member, the flow control member being configured to controllably adjust a swallowing capacity of the turbine, an electric machine operatively coupled to the turbo arrangement for controlling a rotational speed of the turbo arrangement, and a control unit, comprising processing circuitry coupled to the electric machine and the flow control member, the processing circuitry being configured to determine a current operating parameter of the turbine, determine a current operating parameter of exhaust gas exhausted from the internal combustion engine, and determine a current operating condition, of a total number of operating conditions, of the turbine based on at least one of the current operating parameter of the turbine and the current operating parameter of the exhaust gas, and in response to the current operating condition forming part of a predetermined subset of operating conditions of the total number of operating conditions control the electric machine to adjust the rotational speed of the turbo arrangement, and contemporaneously control the flow control member to adjust the swallowing capacity of the turbine.

The first aspect of the disclosure may seek to mitigate turbine damages caused by high cycle fatigue. A technical benefit may include that the electric machine coupled to the turbo arrangement, together with the flow control member, can be controlled to avoid the turbo arrangement from operating in unfavorable operating conditions. Thus, the operational lifetime of the turbine can be increased. Also, by contemporaneously controlling the electric machine and the flow control member, the operating condition of the turbine can be changed so that it does not form part of the predetermined subset of operating conditions. In addition, due to the contemporaneous control of the electric machine and the flow control member, the internal combustion engine may be operated as desired despite the fact that the operating condition of the turbine is changed.

The definition "current operating parameter of the turbine" should in the following and throughout be construed as a structural parameter of the turbine. According to a non-limiting example, the current operating parameter of the turbine may comprise a current position of the flow control member. The position of the flow control member may control the flow fed through the turbine, i.e. the position may adjust the flow directed through the turbine. According to a further non-limiting example, the current operating parameter of the turbine may comprise a rotational speed of the turbo arrangement. Accordingly, the current operating parameter of the turbine may be used as a parameter for determining a current operating condition of the turbine.

Moreover, the definition "current operating parameter of exhaust gas" should in the following and throughout be construed as a parameter of the exhaust gas, i.e. not a structural parameter. According to a non-limiting example, the current operating parameter of the exhaust gas may comprise a pressure level upstream the turbine. Thus, the pressure level of the exhaust may affect the turbine, and may hence form part of a current operating condition of the turbine. According to another non-limiting example, the current operating parameter of the exhaust gas may comprise an expansion ratio of the exhaust gas in the turbine. A turbine expands the exhaust gas fed therethrough and may affect the turbine and may thus form part of a current operating parameter of the turbine. According to a yet further non-limiting example, the current operating parameter of the exhaust gas may comprise an exhaust flow of the exhaust gas fed from the exhaust gas manifold to the turbine. Thus, a flow of the exhaust gas may affect the turbine and may thus form part of a current operating parameter of the turbine. The turbine should be construes as not only the turbine housing and the turbine blades arranged inside such housing. The turbine may e.g. comprise a wastegate arranged inside or outside the turbine housing, etc.

Further, and as may be evident from the above description, the current operating condition of the turbine should be understood as a current condition of the turbine caused by at least one of the current operating parameters of the turbine and the current operating parameter of the exhaust gas. For example, for a specific operating parameter of the turbine or the exhaust gas, the turbine may be operated at a certain operating condition. The total number of operating conditions may thus be seen as the total number of different available operating conditions operable by the turbine, of which the predetermined subset of operating conditions can be construed as identified as unfavorable, i.e. the turbine may be negatively affected when operated at an operating condition forming part of the predetermined subset of operating conditions.

Still further, the swallowing capacity of the turbine should be construed as the volume flow, or volume rate, the turbine is able to receive and exhaust. Thus, and as defined above, the flow control member may adjust such volume or volume rate.

In some examples, including in at least one preferred example, optionally the electric machine may be controlled to adjust the rotational speed of the turbo arrangement such that a subsequent operating condition of the turbine falls outside the predetermined subset of operating conditions in response to the current operating condition forming part of the predetermined subset of operating conditions.

A technical benefit may include that a rapid control is performed such that the operating condition of the turbine falls outside the predetermined subset of operating conditions. In other words, the turbine is not operated at an unfavorable operating condition that e.g. may cause high cycle fatigue damage to components of the turbine.

Optionally, in some examples, including in at least one preferred example, the processing circuitry may be further configured to determine a desired output torque of a crankshaft of the internal combustion engine, and control the electric machine and the flow control member such that a resulting output torque of the crankshaft is within a predetermined range of the desired output torque.

A technical benefit may include that, when contemporaneously controlling the electric machine and the flow control member, the output torque of the crankshaft may be maintained substantially the same as prior to controlling the electric machine and the flow control member. In addition, or as an alternative, the supply of fuel to the internal combustion engine may be controlled to be substantially the same before and after the electric machine and the flow control member are controlled. Hence, the internal combustion engine arrangement may maintain substantially the same operating condition before and after the electric machine and the flow control member are controlled as described above.

The resulting output torque is thus preferably the torque of the crankshaft after the contemporaneous control of the electric machine and the flow control member. The control unit may receive a signal indicative of the resulting output torque, and if the resulting output torque falls outside the predetermined range, the electric machine and/or the flow control member may be controlled to adjust the resulting output torque. The processing circuitry may, alternatively or additionally, determine a pressure level of the combustion gas in the exhaust manifold and control the electric machine and the flow control member such that a resulting pressure level of the combustion gas in the exhaust manifold is within a predetermined range of the desired output torque.

Optionally, in some examples, including in at least one preferred example, the flow control member may be positioned upstream of turbine blades of the turbine.

A technical benefit may include that the swallowing capacity of the turbine can be efficiently controlled since an adjustment of the exhaust gas fed into the turbine can be controlled prior to the exhaust gas enters an inlet of the turbine.

Optionally, in some examples, including in at least one preferred example, wherein the turbine may be a variable geometry turbine.

A technical benefit may include that the swallowing capacity of such variable geometry turbine can be rapidly and efficiently adjusted.

Optionally, in some examples, including in at least one preferred example, the flow control member may be one of a pivoting nozzle vane, an adjustable vane arranged at a turbine inlet, or a flow control valve arranged at the turbine inlet.

Optionally, in some examples, including in at least one preferred example, the predetermined subset of operating conditions may be formed by a predetermined set of predetermined threshold limits.

A technical benefit may include that the predetermined threshold limits can be known in advance as negatively affecting the turbine and may cause e.g. high cycle fatigue damage to components of the turbine.

Optionally, in some examples, including in at least one preferred example, the internal combustion engine arrangement may further comprise a first pressure sensor arranged to detect a pressure level upstream the turbine.

Optionally, in some examples, including in at least one preferred example, the internal combustion engine arrangement may further comprise a second pressure sensor arranged to detect a pressure level of exhaust gas downstream the turbine.

A technical benefit of using a first and second pressure sensors may include that rapid adjustment, i.e. controlling the electric machine and the flow control member, to avoid the predetermined subset of operating conditions can be executed rapidly in response to data received from the first and/or second pressure sensor.

Each of the first and second pressure sensors may also be formed by so-called virtual sensors. A virtual sensor should be construed as a module of a computer system that contains pressure level data for a plurality of operating conditions of the internal combustion engine arrangement. Put it differently, the module of the computer system may know in advance a pressure level upstream/downstream the turbine for a number of different operating conditions of the internal combustion engine arrangement. The data obtained by the module of the computer system may be received from testing, simulation, field truck data, etc.

Optionally, in some examples, including in at least one preferred example, the internal combustion engine may be configured to assume an engine brake operation, the processing circuitry being further configured to receive a signal indicative of an engine brake operation of the internal combustion engine, and control the electric machine and the flow control member in response to the current operating condition forming part of the predetermined subset of operating conditions when the internal combustion engine assumes the engine brake operation.

During engine brake operation, i.e. during engine braking, the turbine may be exposed to an expansion ratio of the turbine, or an inlet pressure of the turbine, which may negatively affect components of the turbine. Put it differently, there may be an increased risk that the current operating condition of the turbine forms part of the predetermined subset of operating conditions during engine braking, and a technical benefit may be that an engine braking operation can be performed with a reduced risk of high cycle fatigue of components of the turbine.

Optionally, in some examples, including in at least one preferred example, the internal combustion engine arrangement may further comprise an engine aftertreatment system arranged in downstream fluid communication with the turbine, the processing circuitry being further configured to receive a signal indicative of a temperature adjustment mode of the engine aftertreatment system, and control the electric machine and the flow control member in response to the current operating condition forming part of the predetermined subset of operating conditions when the engine aftertreatment system assumes the temperature adjustment mode.

Optionally, in some examples, including in at least one preferred example, the temperature adjustment mode may be a heat mode in which a temperature level of the engine aftertreatment system is increased above a predetermined threshold temperature level. The predetermined threshold temperature level should be construed as also including a temperature threshold rate, i.e. an increase of temperature per time unit.

The temperature adjustment mode may thus also be referred to as a heat mode. During this mode of operation, i.e. when there is a desire to increase the temperature of the engine aftertreatment system, the turbine is conventionally controlled to create a back pressure. The back pressure will increase the temperature of the exhaust gas fed to the engine aftertreatment system, but may also negatively affect components of the turbine, i.e. expose the components to high cycle fatigue damage. A technical benefit may thus include that the internal combustion engine may perform the temperature adjustment mode with a reduced risk of high cycle fatigue of components of the turbine.

According to a second aspect of the disclosure, there is provided a vehicle, comprising an internal combustion engine arrangement of any one of the examples described above in relation to the first aspect.

Effects and features of the second aspect are largely analogous to those described above in relation to the first aspect.

According to a third aspect of the disclosure, there is provided a method of controlling an internal combustion engine arrangement, the internal combustion engine arrangement comprises an internal combustion engine and a turbo arrangement, the method comprising determining, by a processing circuitry, a current operating parameter of a turbine of the turbo arrangement, the turbine being arranged in downstream fluid communication with an exhaust manifold of the internal combustion engine, determining, by the processing circuitry, a current operating parameter of exhaust gas exhausted from the internal combustion engine, determining, by the processing circuitry, a current operating condition, of a total number of operating conditions, of the turbine based on at least one of the current operating parameter of the turbine and the current operating parameter of the exhaust gas, and in response to the current operating condition forming part of a predetermined subset of operating conditions of the total number of operating conditions: controlling, by the processing circuitry, an electric machine, coupled to the turbine, to adjust the rotational speed of the turbo arrangement, and contemporaneously controlling, by the processing circuitry, a flow control member of the turbine to adjust the swallowing capacity of the turbine.

Effects and features of the third aspect are largely analogous to those described above in relation to the first aspect.

According to a fourth aspect, there is provided a computer program product comprising program code for performing, when executed by processing circuitry, the method of the third aspect.

According to a fifth aspect, there is provided a non-transitory computer-readable storage medium comprising instructions, which when executed by processing circuitry, cause the processing circuitry to perform the method of the third aspect.

Effects and features of the fourth and fifth aspects are largely analogous to those described above in relation to the first aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

FIG. 2 is exemplary illustration of an internal combustion engine arrangement according to an example, FIGS. 3A-5B are exemplary illustrations of flow control members of a turbine according to examples.

DETAILED DESCRIPTION

The detailed description set forth below provides information and examples of the disclosed technology with sufficient detail to enable those skilled in the art to practice the disclosure.

The disclosure described in the following may seek to mitigate turbine damages caused by high cycle fatigue. A technical benefit may include that the electric machine coupled to the turbo arrangement, together with the flow control member, can be controlled to avoid the turbo arrangement from operating in unfavorable operating conditions. Thus, the operational lifetime of the turbine can be increased.

Figure 1:
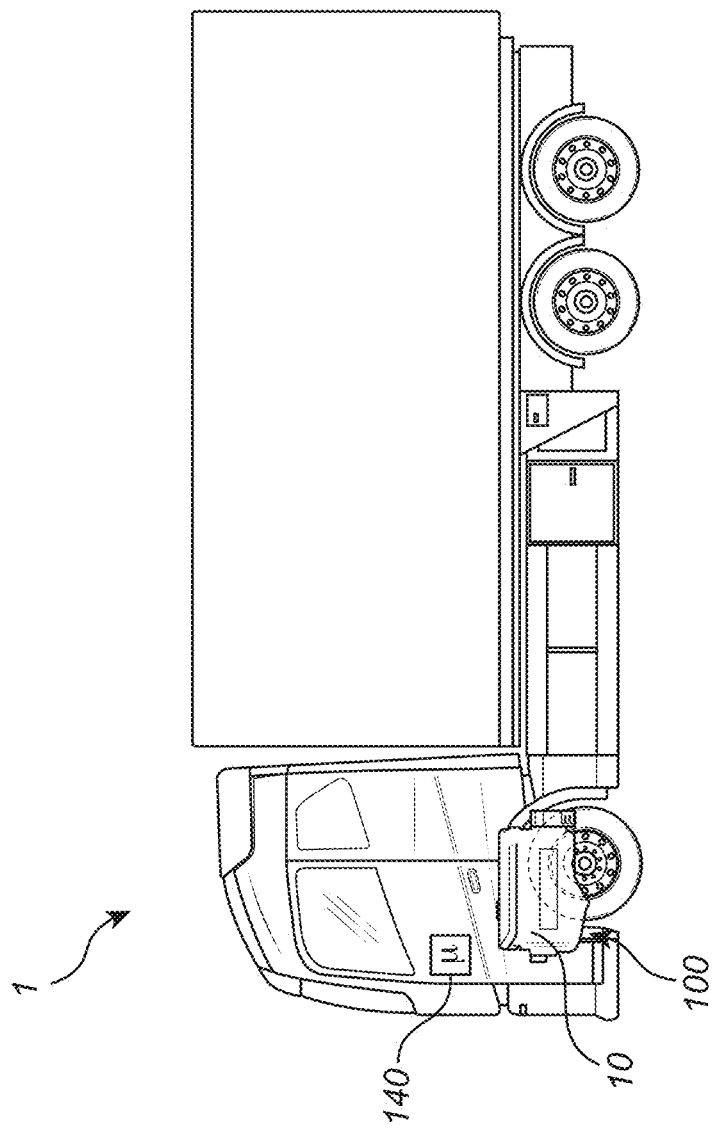
FIG. 1 is an exemplary illustration of a vehicle in the form of a truck according to an example.

Reference is made to FIG. 1 which is an exemplary illustration of a vehicle 1 according to an example. The vehicle 1 in FIG. 1 is exemplified as a truck, but the below description may be provided in other vehicles, such as e.g. working machines, buses, cars, etc. The vehicle 1 comprises an internal combustion engine arrangement 100. The internal combustion engine arrangement 100 comprises an internal combustion engine 10 configured to receive gas for combustion in its combustion chamber(s). The internal combustion may be a internal combustion, a petrol based internal combustion, a diesel based internal combustion engine, etc. Further, the internal combustion engine arrangement 100 also comprises a control unit 140. The control unit 140 comprises a processor device configured to control the internal combustion engine arrangement 100 as will be described in further detail below.

In order to describe the internal combustion engine arrangement 100 in further detail, reference is made to FIG. 2. As can be seen in FIG. 2 and as indicated above, the internal combustion engine arrangement 100 comprises an internal combustion engine 10. The internal combustion engine 10 comprises a plurality of combustion cylinders 200. In FIG. 2, the internal combustion engine 10 is exemplified as comprising six combustion cylinders 200, although the present disclosure is applicable for a different number of combustion cylinders 200. Each of the combustion cylinders 200 is associated with an inlet valve 202 and an exhaust valve 204. Hence, the internal combustion engine 10 comprises a plurality of inlet valves 202 and a plurality of exhaust valves 204, where the inlet 202 and exhaust 204 valves are schematically illustrated in FIG. 2 to simplify understanding for the skilled reader. In FIG. 2, each combustion cylinder 200 is associated with one inlet valve 202 and one exhaust valve 204. It should however be readily understood that each combustion cylinder 200 may equally as well be associated with more than one inlet valve 202 and more than one exhaust valve 204.

Further, the internal combustion engine 10 comprises an inlet manifold 206 at which air is received and further fed into the combustion cylinders 200 via the inlet valves 202. Also, the internal combustion engine 10 comprises an exhaust manifold 208 configured to receive combustion gas exhausted from the combustion cylinders 200 via the exhaust valves 204.

Still further, the internal combustion engine arrangement 100 comprises a turbo arrangement 210. The turbo arrangement 210 comprises a turbine 212 arranged in downstream fluid communication with the exhaust manifold 208 of the internal combustion engine 10. Thus, during operation, the turbine 212 receives and expands combustion gas exhausted from the combustion cylinders 200 of the internal combustion engine 10. The turbine 212 is further arranged in upstream fluid communication with an exhaust outlet 220. Hence, the expanded combustion gas from the turbine is exhausted towards the exhaust outlet 220. In the example depicted in FIG. 2, the internal combustion engine arrangement 100 further comprises an engine aftertreatment system 230 arranged in fluid communication between the turbine 212 and the exhaust outlet 220.

The turbo arrangement 210 also comprises a compressor 214. The compressor 214 is mechanically connected to the turbine 212 and configured to pressurize ambient air. Preferably, the compressor 214 is connected to the turbine 212 via a turbo shaft 215. The pressurized ambient air is fed to the inlet manifold 206. Thus, the compressor 214 is arranged in upstream fluid communication with the inlet manifold 206.

Still further, the internal combustion engine arrangement 100 also comprises an electric machine 216 operatively coupled to the turbo arrangement 210. The electric machine 216 is configured to control a rotational speed of the turbo arrangement 210. As exemplified in FIG. 2, the electric machine 216 is connected between the turbine 212 and the compressor 214. In detail, the example depicted in FIG. 2 illustrates the electric machine 216 as connected to the turbo shaft 215. It should however be readily understood that the electric machine 216 may in itself form the turbo shaft. In the latter example, the turbine 212 and the compressor 214 are mechanically coupled to each other via the electric machine 216.

During operation, the rotational speed of the turbine arrangement 210 may be controlled by the exhaust flow of combustion gas from the combustion cylinders 200 as well as by controlling the rotational speed of the electric machine 216. The electric machine 216 may thus increase the rotational speed of the turbo arrangement 210 and/or reduce the rotational speed of the turbo arrangement 210. The electric machine 216 may thus be operable as an electric motor as well as an electric generator. Although not depicted in FIG. 2, the vehicle 1 may comprise a battery configured to feed electric power to the electric machine 216 when the electric machine acts as an electric motor, and to receive electric power when the electric machine acts as an electric generator.

According to the example depicted in FIG. 2, the internal combustion engine arrangement 100 may also comprise a first pressure sensor 250 and a second pressure sensor 260. The first pressure sensor 250 is configured to detect a pressure level of the combustion gas exhausted from the combustion cylinders 200 at a position upstream the turbine 212. The second pressure sensor 260 on the other hand is configured to detect a pressure level of exhaust gas at a position downstream the turbine 212, preferably at a position between the turbine 212 and the engine aftertreatment system 230.

As described above in relation to FIG. 1, the internal combustion engine arrangement comprises a control unit 140. The control unit 140 comprises processing circuitry coupled to the electric machine 216. For the example where the internal combustion engine arrangement 100 comprises the first 250 and second 260 pressure sensors, the control unit 140 is also preferably coupled to the first 250 and second 260 pressure sensors. Further, and as will be described in detail below with reference to FIGS. 3-5, the turbine 212 comprises a flow control member to which the processing circuitry is coupled to controllably adjust a swallowing capacity of the turbine 212.

In order to describe examples of the turbine 212, reference is now made to FIGS. 3A-5B which are exemplary illustrations of different turbines 212, each comprising a specific flow control member.

Initial reference is made to FIGS. 3A-3B illustrating the turbine 212 in two different configurations. The turbine 212 comprises a turbine inlet 302 for receiving combustion gas 301 exhausted from the combustion cylinders (200 in FIG. 2). The turbine 212 also comprises a turbine outlet 304 for exhausting combustion gas, expanded by the turbine, towards the ambient environment. Moreover, the turbine 212 comprises a plurality of turbine blades 305 configured to generate a rotating motion of the turbo shaft (215 in FIG. 2) upon being exposed to the flow of combustion gas exhausted from the combustion cylinders (200 in FIG. 2).

Furthermore, the turbine 212 comprises a flow control member 306. In the example depicted in FIGS. 3A-3B, the flow control member 306 comprises a plurality of pivoting nozzle vanes 306. In the example depicted in FIG. 3A, the pivoting nozzle vanes 306 are controlled by the processing circuitry to assume a substantially closed position only allowing a low amount of combustion gas 301 to be fed to the turbine blades 305, and further towards the turbine outlet 304. In the example depicted in FIG. 3A, the swallowing capacity of the turbine 212 is thus reduced. In the example depicted in FIG. 3B, the pivoting nozzle vanes 306 are controlled by the processing circuitry to assume an open position. The nozzle vanes nozzle 306 are rotated about an axis of rotation to allow a high amount of combustion gas to be fed to the turbine blades 305, and further towards the turbine outlet 304. In the example depicted in FIG. 3A, the swallowing capacity of the turbine 212 is thus reduced. In other words, by controlling the plurality of pivoting nozzle vanes 306, the swallowing capacity of the turbine 212 can be adjusted. The examples depicted in FIGS. 3A and 3B only illustrates two states, i.e. two different positions of the nozzle vanes 306. It should however be readily understood that the nozzle vanes 306 may be controlled to assume other positions than those depicted in the figures. Hence, the openness degree of the nozzle vanes 306 may be controlled to assume other positions to adjust the swallowing capacity of the turbine as desired. The turbine illustrated in FIGS. 3A-3B may be referred to as a variable geometry turbine.

Turning now to FIGS. 4A-4B which illustrate another example of the turbine 212. In a similar vein as the example depicted in FIGS. 3A-3B, FIGS. 4A-4B illustrate the turbine 212 in two different configurations. The turbine 212 comprises a turbine inlet 302 for receiving combustion gas 301 exhausted from the combustion cylinders (200 in FIG. 2). The turbine 212 also comprises a turbine outlet 304 for exhausting combustion gas, expanded by the turbine, towards the ambient environment. Moreover, the turbine 212 comprises a plurality of turbine blades 305 configured to generate a rotating motion of the turbo shaft (215 in FIG. 2) upon being exposed to the flow of combustion gas exhausted from the combustion cylinders (200 in FIG. 2).

Furthermore, the turbine 212 comprises a flow control member 150. In the example depicted in FIGS. 4A-4B, the flow control member 150 is formed by an inlet vane 406. The inlet vane 406 is arranged at the turbine inlet 302, i.e. at a position upstream of the turbine blades 305, and controllable, by the processing circuitry, between a closed position as depicted in FIG. 4A at which the pressure level in the turbine is increased, and an open position as depicted in FIG. 4B at which combustion gas is fed towards the turbine blades 305 and the pressure level in the turbine is reduced. In the example depicted in FIG. 4A, the swallowing capacity of the turbine 212 is thus reduced, while the swallowing capacity for the example depicted in FIG. 4B is increased. In other words, by controlling the inlet vane 406, the swallowing capacity of the turbine 212 can be adjusted. When the inlet vane 406 is arranged in the closed position, the force acting on the turbine blades will be increased. The examples depicted in FIGS. 4A and 4B only illustrates two states, i.e. two different positions of the inlet vane 406. It should however be readily understood that the inlet vane 406 may be controlled to assume other positions than those depicted in the figures. Hence, the openness degree of the inlet vane 406 may be controlled to assume other positions to adjust the swallowing capacity of the turbine as desired.

Turning now to FIGS. 5A-5B which illustrate another example of the turbine 212. In a similar vein as the example depicted in FIGS. 3A-4B, FIGS. 5A-5B illustrate the turbine 212 in two different configurations. The turbine 212 comprises a turbine inlet 302 for receiving combustion gas 301 exhausted from the combustion cylinders (200 in FIG. 2). The turbine 212 also comprises a turbine outlet 304 for exhausting combustion gas, expanded by the turbine, towards e.g. an engine aftertreatment system. Moreover, the turbine 212 comprises a plurality of turbine blades 305 configured to generate a rotating motion of the turbo shaft (215 in FIG. 2) upon being exposed to the flow of combustion gas exhausted from the combustion cylinders (200 in FIG. 2).

Furthermore, the turbine 212 comprises a flow control member 150. In the example depicted in FIGS. 5A-5B, the flow control member 150 is formed by a valve 506. The valve 506 is arranged at the turbine inlet 302, i.e. at a position upstream of the turbine blades 305, and controllable, by the processing circuitry, between a closed position as depicted in FIG. 5A and an open position as depicted in FIG. 5B. The exemplified turbine 212 depicted in FIGS. 5A and 5B comprises a first flow channel 510 and a second flow channel 520. The first 510 and second 520 flow channels merge into a combined flow channel 530 at a convergence position 525 of a plate 535 separating the first flow channel 510 from the second flow channel 520.

When the valve 506 assumes the closed position depicted in FIG. 5A, combustion gas is fed towards the turbine blades 304 solely via the second flow channel 520 and subsequently via the combined flow channel 530. Hence, the combustion gas 301 is, by arranging the valve 506 in the closed position, prevented from reaching the first flow channel 510 whereby a reduced swallowing capacity of the turbine 212 is obtained.

When the valve 506 assumes the open position depicted in FIG. 5B, combustion gas is fed towards the turbine blades 304 via the first flow channel 510 as well as via the second flow channel 520. The combustion gas 301 fed through the first 510 and second 520 flow channels are subsequently mixed with each other at the combined flow channel 530. A larger amount of combustion gas 301 thus reaches the turbine blades 305 when the valve 506 assumes the open position compared to when the valve assumes the closed position, whereby an increased swallowing capacity of the turbine 212 is obtained. In other words, by controlling the valve 506, the swallowing capacity of the turbine 212 can be adjusted. The examples depicted in FIGS. 5A and 5B only illustrates two states, i.e. a completely closed position and a fully open position of the valve 506. It should however be readily understood that the valve 506 may be controlled to assume other positions than those depicted in the figures. Hence, the openness degree of the valve 506 may be controlled to assume other positions to adjust the swallowing capacity of the turbine as desired.

Although various examples of flow control members 150 are illustrated in FIGS. 3A-5B, it should be readily understood that other flow control members 150 are conceivable to adjust the swallowing capacity of the turbine 212. For example, a wastegate may be used for controlling the flow of combustion gas fed into the turbine 212. Such wastegate may be an external wastegate arranged upstream the turbine inlet 302, at which external wastegate the combustion gas, or a portion of the combustion gas, can be directed to by-pass the turbine to thereby adjust the swallowing capacity of the turbine 212. The wastegate may also be an internal wastegate arranged inside the turbine 212. Also, the flow control members 150 may alternatively be arranged in the form of sliding wall nozzle instead of e.g. the above described rotating nozzle vane.

Figure 6:
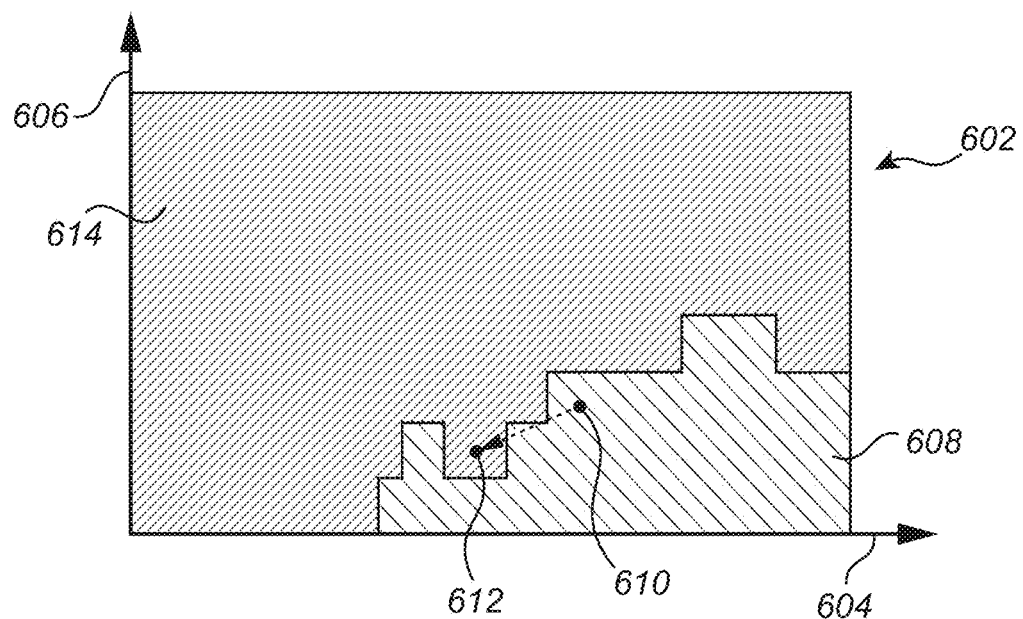
FIG. 6 is an exemplary illustration of an operating condition of the turbine according to an example.
Figure 7:
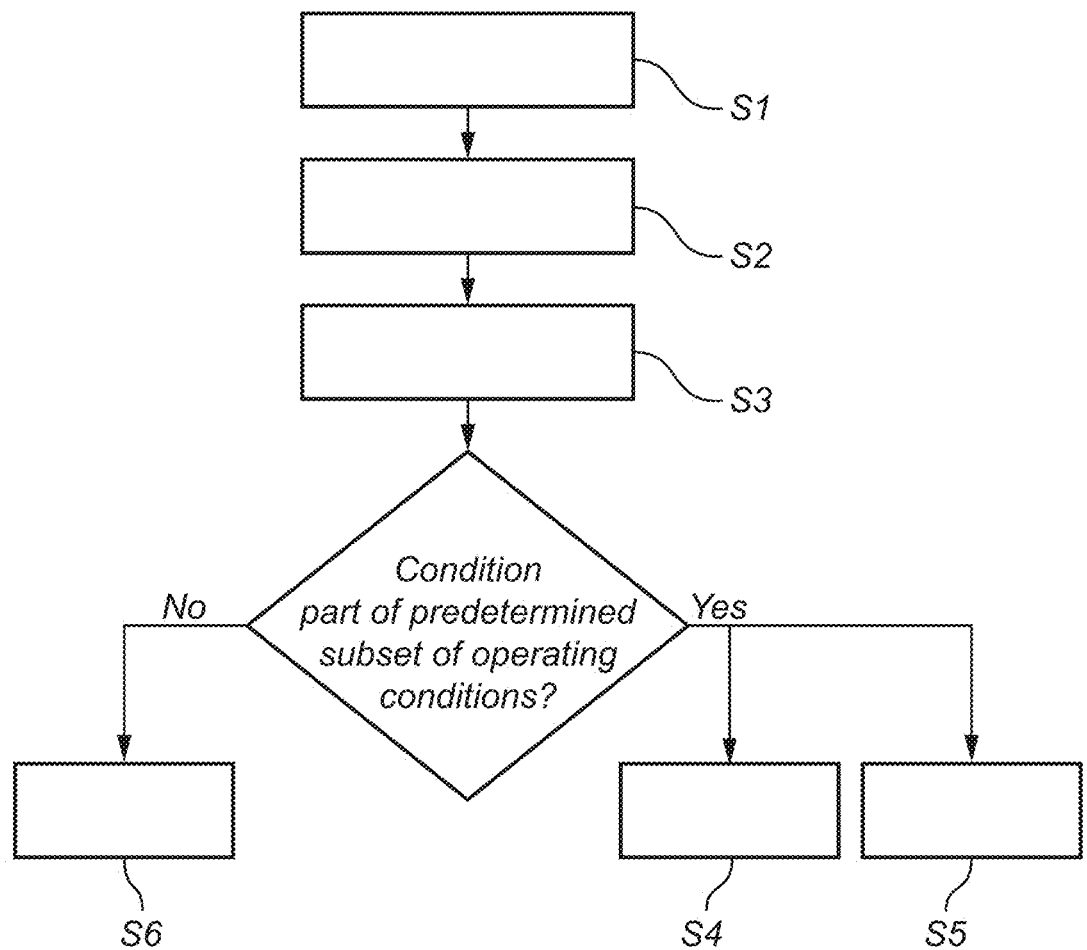
FIG. 7 is an exemplary illustration of a flow chart for controlling an internal combustion engine according to an example.

In order to describe the operation of the internal combustion engine arrangement described above, reference is now made to FIGS. 6 and 7. FIG. 6 is an exemplary illustration of an operating condition of the turbine according to an example and FIG. 7 is an exemplary illustration of a flow chart for controlling an internal combustion engine according to an example. In detail, the graph in FIG. 6 schematically illustrates a total number of operating conditions 602 of the turbine 212. Thus, the turbine 212 is operable to assume substantially any operating condition as a position within the area formed by the abscissa axis 604 and the ordinate axis 606. The operating condition in the area formed by the abscissa axis 604 and the ordinate axis 606 is determined based on at least one of a current operating parameter of the turbine, e.g. a structural parameter of the turbine, and a current operating parameter of exhaust gas exhausted from the internal combustion engine 10, e.g. a parameter of the exhaust gas, i.e. not a structural parameter. Put it differently, and according to an example, the exhaust flow, i.e. a current operating parameter of exhaust gas exhausted from the internal combustion engine 10, acting on the turbine, in combination with a position of the flow control member, i.e. a current operating parameter of the turbine, together form a current operating condition, of the total number of operating conditions, of the turbine.

The abscissa axis 604 may represent an operating parameter of the turbine, such as e.g. a position of the flow control member 150 described above in relation to FIGS. 3A-5B, a rotational speed of the turbo arrangement 210, etc. The abscissa axis 604 may also represent a current operating parameter of exhaust gas exhausted from the internal combustion engine 10, such as e.g. a pressure level of the combustion gas upstream the turbine, an expansion ratio of the exhaust gas in the turbine, an exhaust flow of the exhaust gas fed from the exhaust gas manifold to the turbine, etc.

The ordinate axis 606 may also represent an operating parameter of the turbine, such as e.g. a position of the flow control member 150 described above in relation to FIGS. 3A-5B, a rotational speed of the turbo arrangement 210, etc. The ordinate axis 606 may however also represent a current operating parameter of exhaust gas exhausted from the internal combustion engine 10, such as e.g. a pressure level of the combustion gas upstream the turbine, an expansion ratio of the exhaust gas in the turbine, an exhaust flow of the exhaust gas fed from the exhaust gas manifold to the turbine, etc.

Accordingly, different parameter combinations may be obtained when determining a current operating condition of the turbine. Put it differently, a current operating parameter of the turbine 212 is determined S1. Also, a current operating parameter of exhaust gas exhausted from the internal combustion engine 10 is determined S2. By, for example, combining two different current operating conditions of the turbine, two different current operating parameters of the exhaust gas, or a current operating parameter of the turbine 212 with a current operating parameter of the exhaust gas, the current operating condition, of the total number of operating conditions, of the turbine 212 can be determined S3.

In order to simplify the description for the skilled reader, the method of controlling the internal combustion engine arrangement 100 will in the following present an example in which the abscissa axis 604 represents a current operating parameter of the turbine 212 in the form of a current position of the flow control member 150. The ordinate axis 606 also represents a current operating parameter of the turbine 212, but in the form of a rotational speed of the turbo arrangement. As previously described and as is evident from the above, the method described in the following may also be applicable for other combinations of parameters when determining S3 the current operating condition of the turbine 212. Also, not only a combination of two parameters could be evaluated, but rather a combination of a plurality of parameters, i.e. more than two such as three or more parameters may provide a current operating condition of the turbine.

In FIG. 6, a predetermined subset of operating conditions 608, from the total number of operating conditions 602 is determined. The predetermined subset of operating conditions 608 represent operating conditions which are unfavorable for the turbine 212. In particular, if the current position of the flow control member 150 in combination with the rotational speed of the turbo arrangement generates a current operating condition 610 of the turbine 212 falling within the predetermined subset of operating conditions, the turbine may, for example, be exposed to high cycle fatigue load. The high cycle fatigue may be caused by the eigenfrequency of the turbine blades 305 coincides with an exciting force with the same frequency. This may overcome the inherent damping of the turbine blades 212 and thus cause stress damages to the blades. The predetermined subset of operating conditions 608 may thus represent eigenfrequencies that could be damageable for the turbine 212.

In FIG. 6, the current operating condition 610 is forming part of the predetermined subset of operating conditions 608. Accordingly, the current operating condition 610 of the turbine 212 could be damageable for the turbine 212, i.e. the turbine could be exposed to high cycle fatigue loads. To avoid the turbine to operate in the unfavorable operating condition that forms part of the predetermined subset of operating conditions, the control unit 140 controls S4 the electric machine 216 to adjust the rotational speed of the turbo arrangement 210. Contemporaneously, the control unit 140 also controls S5 the flow control member 150 to adjust the swallowing capacity of the turbine 212. When the control unit 140 controls the electric machine 216 as well as the flow control member 150, the current operating condition 610 will be changed to assume a subsequent operating condition 612 that falls outside the predetermined subset of operating conditions 608. Hence, the subsequent operating condition 612 will fall part of a predetermined remaining operating conditions 614. As is evident from the above, the predetermined subset of operating conditions 608 and the predetermined remaining operating conditions 614 constitutes the total number of operating conditions 602 of the turbine 212.

If, on the other hand, the current operating condition does not form part of the predetermined subset of operating conditions 608, i.e. forms part of the predetermined remaining operating conditions 614, the control unit 140 may continue to control S6 the electric machine 216 as well as the flow control member 150 as before, i.e. no adjustment based on operating condition being in a high cycle fatigue area is performed.

When the control unit 140 controls the electric machine 216 and the flow control member 150 to be adjusted, not only will the turbine 212 assume an operating condition falling outside the predetermined subset of operating conditions 608, but also a resulting output torque on the crankshaft may be provided within a predetermined range of a desired output torque. In detail, the operating condition of the turbine 212 may be controlled while at the same time preserving the internal combustion engine to be operated as desired. Thus, a dual technical advantage is obtained, where the internal combustion engine arrangement 100 is operable as desired while reducing the risk of turbine failure. A more or less optimized engine power as well as reduced emissions may be obtained.

According to non-limiting examples, the turbine 212 may be particularly exposed to high-cycle fatigue loads during engine braking operation as well as during a heat mode operation. During engine braking operation, the turbine may be exposed to a back pressure that may cause the operating condition of the turbine to form part of the above described predetermined subset of operating conditions, in particular when aiming to reach high engine brake power. During a heat mode operation on the other hand, the turbine may be controlled to create a back pressure in order to increase the temperature of the combustion gas fed to the engine after treatment system. By controlling the turbine in this manner, there may be a risk that the operating condition of the turbine 212 forms part of the predetermined subset of operating conditions 608.

Figure 8:
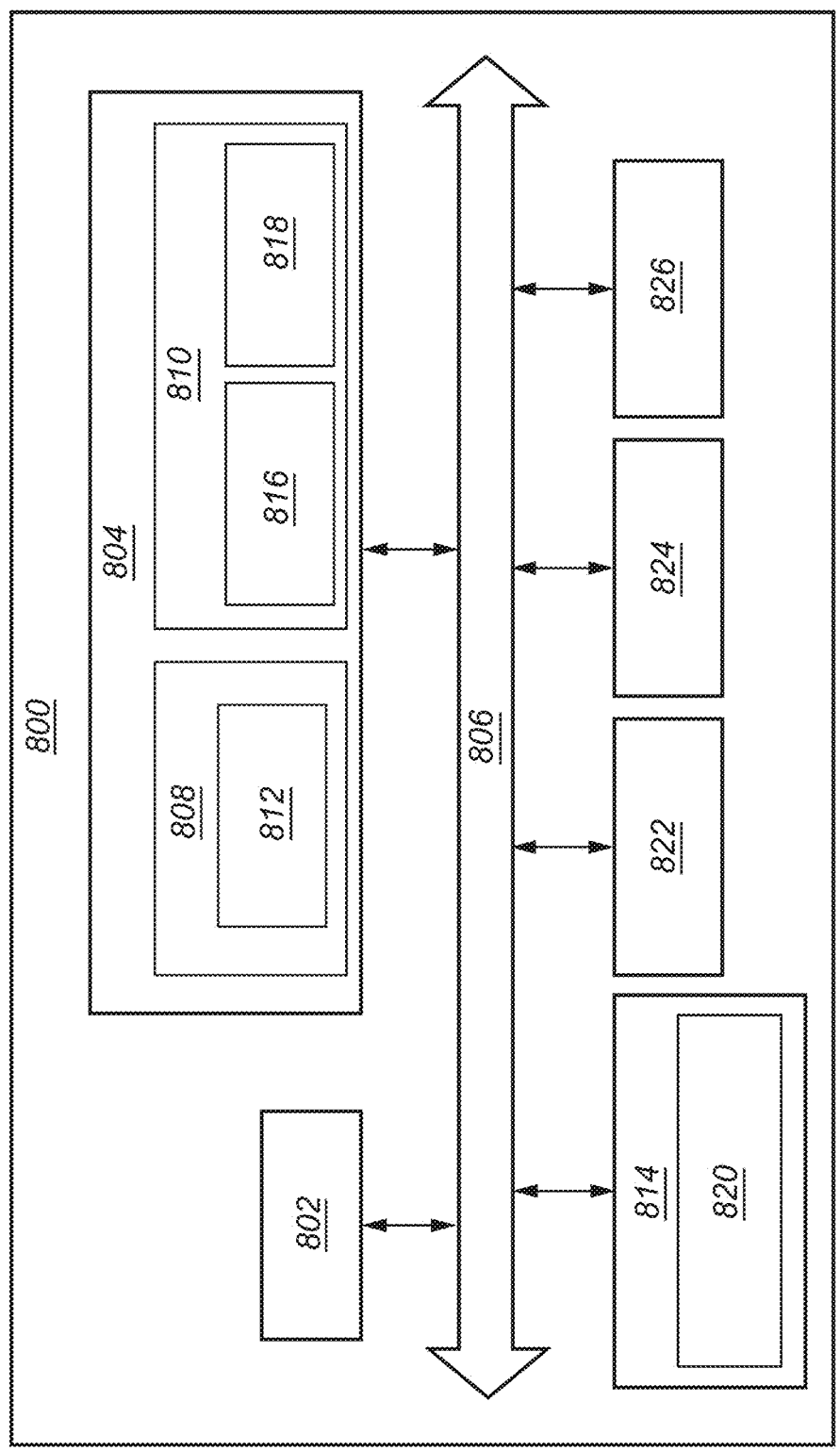
FIG. 8 is a schematic diagram of an exemplary computer system for implementing examples disclosed herein, according to an example.

Turning now to FIG. 8, which is a schematic diagram of a computer system 800 for implementing examples disclosed herein. The computer system 800 is adapted to execute instructions from a computer-readable medium to perform these and/or any of the functions or processing described herein. The computer system 800 may be connected (e.g., networked) to other machines in a LAN, an intranet, an extranet, or the Internet. While only a single device is illustrated, the computer system 800 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 800 may comprise at least one computing device or electronic device capable of including firmware, hardware, and/or executing software instructions to implement the functionality described herein. The computer system 800 may include processing circuitry 802 (e.g., processing circuitry including one or more processor devices or control units), a memory 804, and a system bus 806. The computer system 800 may include at least one computing device having the processing circuitry 802. The system bus 806 provides an interface for system components including, but not limited to, the memory 804 and the processing circuitry 802. The processing circuitry 802 may include any number of hardware components for conducting data or signal processing or for executing computer code stored in memory 804. The processing circuitry 802 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 802 may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicatively connected to the processing circuitry 802 (e.g., via a circuit or any other wired, wireless, or network connection) and may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with processing circuitry 802. A basic input/output system (BIOS) 812 may be stored in the non-volatile memory 808 and can include the basic routines that help to transfer information between elements within the computer system 800.

The computer system 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 814 and/or in the volatile memory 810, which may include an operating system 816 and/or one or more program modules 818. All or a portion of the examples disclosed herein may be implemented as a computer program 820 stored on a transitory or non-transitory computer-usable or computer-readable storage medium (e.g., single medium or multiple media), such as the storage device 814, which includes complex programming instructions (e.g., complex computer-readable program code) to cause the processing circuitry 802 to carry out actions described herein. Thus, the computer-readable program code of the computer program 820 can comprise software instructions for implementing the functionality of the examples described herein when executed by the processing circuitry 802. In some examples, the storage device 814 may be a computer program product (e.g., readable storage medium) storing the computer program 820 thereon, where at least a portion of a computer program 820 may be loadable (e.g., into a processor) for implementing the functionality of the examples described herein when executed by the processing circuitry 802. The processing circuitry 802 may serve as a controller or control system for the computer system 800 that is to implement the functionality described herein.

The computer system 800 may include an input device interface 822 configured to receive input and selections to be communicated to the computer system 800 when executing instructions, such as from a keyboard, mouse, touch-sensitive surface, etc. Such input devices may be connected to the processing circuitry 802 through the input device interface 822 coupled to the system bus 806 but can be connected through other interfaces, such as a parallel port, an Institute of Electrical and Electronic Engineers (IEEE) 1394 serial port, a Universal Serial Bus (USB) port, an IR interface, and the like. The computer system 800 may include an output device interface 824 configured to forward output, such as to a display, a video display unit (e.g., a liquid crystal display (LCD) or a cathode ray tube (CRT)). The computer system 800 may include a communications interface 826 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example List

Example 1: An internal combustion engine arrangement, comprising an internal combustion engine, a turbo arrangement, comprising a turbine arranged in downstream fluid communication with an exhaust manifold of the internal combustion engine, and a compressor mechanically connected to the turbine, the compressor being arranged in upstream fluid communication with an inlet manifold of the internal combustion engine, wherein the turbine comprises a flow control member, the flow control member being configured to controllably adjust a swallowing capacity of the turbine, an electric machine operatively coupled to the turbo arrangement for controlling a rotational speed of the turbo arrangement, and a control unit, comprising processing circuitry coupled to the electric machine and the flow control member, the processing circuitry being configured to: determine a current operating parameter of the turbine, determine a current operating parameter of exhaust gas exhausted from the internal combustion engine, and determine a current operating condition, of a total number of operating conditions, of the turbine based on at least one of the current operating parameter of the turbine and the current operating parameter of the exhaust gas, and in response to the current operating condition forming part of a predetermined subset of operating conditions of the total number of operating conditions: control the electric machine to adjust the rotational speed of the turbo arrangement, and contemporaneously control the flow control member to adjust the swallowing capacity of the turbine.

Example 2: The internal combustion engine arrangement of example 1, wherein the electric machine is controlled to adjust the rotational speed of the turbo arrangement such that a subsequent operating condition of the turbine falls outside the predetermined subset of operating conditions in response to the current operating condition forming part of the predetermined subset of operating conditions.

Example 3. The internal combustion engine arrangement of any one of examples 1 or 2, the processing circuitry being further configured to: determine a desired output torque of a crankshaft of the internal combustion engine, and control the electric machine and the flow control member such that a resulting output torque of the crankshaft is within a predetermined range of the desired output torque.

Example 4. The internal combustion engine arrangement of any one of the preceding examples, wherein the flow control member is positioned upstream of turbine blades of the turbine.

Example 5. The internal combustion engine arrangement of any one of the preceding examples, wherein the turbine is a variable geometry turbine.

Example 6. The internal combustion engine arrangement of any one of the preceding examples, wherein the flow control member is one of a pivoting nozzle vane, an adjustable vane arranged at a turbine inlet, or a flow control valve arranged at the turbine inlet.

Example 7. The internal combustion engine arrangement of any one of the preceding examples, wherein the current operating parameter of the turbine comprises a current position of the flow control member.

Example 8. The internal combustion engine arrangement of any one of the preceding examples, wherein the current operating parameter of the turbine comprises a rotational speed of the turbo arrangement.

Example 9. The internal combustion engine arrangement of any one of the preceding examples, wherein the current operating parameter of the exhaust gas comprises a pressure level upstream the turbine.

Example 10. The internal combustion engine arrangement of any one of the preceding examples, wherein the current operating parameter of the exhaust gas comprises an expansion ratio of the exhaust gas in the turbine.

Example 11. The internal combustion engine arrangement of any one of the preceding examples, wherein the current operating parameter of the exhaust gas comprises an exhaust flow of the exhaust gas fed from the exhaust gas manifold to the turbine.

Example 12. The internal combustion engine arrangement of any one of the preceding examples, wherein the predetermined subset of operating conditions is formed by a predetermined set of predetermined threshold limits.

Example 13. The internal combustion engine arrangement of any one of the preceding examples, wherein the internal combustion engine arrangement further comprises a first pressure sensor arranged to detect a pressure level upstream the turbine.

Example 14. The internal combustion engine arrangement of any of the preceding examples, wherein the internal combustion engine arrangement further comprises a second pressure sensor arranged to detect a pressure level of exhaust gas downstream the turbine.

Example 15. The internal combustion engine arrangement of any one of the preceding examples, wherein the internal combustion engine is configured to assume an engine brake operation, the processing circuitry being further configured to: receive a signal indicative of an engine brake operation of the internal combustion engine, and control the electric machine and the flow control member in response to the current operating condition forming part of the predetermined subset of operating conditions when the internal combustion engine assumes the engine brake operation.

Example 16. The internal combustion engine arrangement of any one of the preceding examples, wherein the internal combustion engine arrangement further comprises an engine aftertreatment system arranged in downstream fluid communication with the turbine, the processing circuitry being further configured to: receive a signal indicative of a temperature adjustment mode of the engine aftertreatment system, and control the electric machine and the flow control member in response to the current operating condition forming part of the predetermined subset of operating conditions when the engine aftertreatment system assumes the temperature adjustment mode.

Example 17. The internal combustion engine arrangement of example 16, wherein the temperature adjustment mode is a heat mode in which a temperature level of the engine aftertreatment system is increased above a predetermined threshold temperature level.

Example 18. A vehicle, comprising an internal combustion engine arrangement of any one of the preceding examples.

Example 19. A method of controlling an internal combustion engine arrangement, the internal combustion engine arrangement comprises an internal combustion engine and a turbo arrangement, the method comprising: determining, by a processing circuitry, a current operating parameter of a turbine of the turbo arrangement, the turbine being arranged in downstream fluid communication with an exhaust manifold of the internal combustion engine, determining, by the processing circuitry, a current operating parameter of exhaust gas exhausted from the internal combustion engine, determining, by the processing circuitry, a current operating condition, of a total number of operating conditions, of the turbine based on at least one of the current operating parameter of the turbine and the current operating parameter of the exhaust gas, and in response to the current operating condition forming part of a predetermined subset of operating conditions of the total number of operating conditions: controlling, by the processing circuitry, an electric machine, coupled to the turbine, to adjust the rotational speed of the turbo arrangement, and contemporaneously controlling, by the processing circuitry, a flow control member of the turbine to adjust the swallowing capacity of the turbine.

Example 20. A computer program product comprising program code for performing, when executed by processing circuitry, the method of example 19.

Example 21. A non-transitory computer-readable storage medium comprising instructions, which when executed by processing circuitry, cause the processing circuitry to perform the method of example 19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An internal combustion engine arrangement, comprising
   an internal combustion engine,
   a turbo arrangement, comprising a turbine arranged in downstream fluid communication with an exhaust manifold of the internal combustion engine, and a compressor mechanically connected to the turbine, the compressor being arranged in upstream fluid communication with an inlet manifold of the internal combustion engine, wherein the turbine comprises a flow control member, the flow control member being configured to controllably adjust a swallowing capacity of the turbine,
   an electric machine operatively coupled to the turbo arrangement for controlling a rotational speed of the turbo arrangement, and
   a control unit, comprising processing circuitry coupled to the electric machine and the flow control member, the processing circuitry being configured to:
      determine a current position of the flow control member of the turbine and a current rotational speed of the turbo arrangement,
      determine a current operating parameter of exhaust gas exhausted from the internal combustion engine, and
      determine, for the turbine, a current operating condition, of a total number of operating conditions operable by the turbine, based on the current position of the flow control member, the current rotational speed of the turbo arrangement, the current pressure level of exhaust gas exhausted from the internal combustion engine upstream the turbine and a current expansion ratio of the exhaust gas in the turbine,
      obtain a predetermined subset of operating conditions exposing the turbine to high cycle fatigue, and in response to the current operating condition forming part of the predetermined subset of operating conditions:
         control the electric machine to adjust the rotational speed of the turbo arrangement, and contemporaneously
         control the flow control member to adjust the swallowing capacity of the turbine,
      such that a subsequent operating condition of the turbine falls outside the predetermined subset of operating conditions in response to the current operating condition forming part of the predetermined subset of operating conditions.

2. The internal combustion engine arrangement of claim 1, the processing circuitry being further configured to:
   determine a desired output torque of a crankshaft of the internal combustion engine, and
   control the electric machine and the flow control member such that a resulting output torque of the crankshaft is within a predetermined range of the desired output torque.

3. The internal combustion engine arrangement of claim 1, wherein the flow control member is positioned upstream of turbine blades of the turbine.

4. The internal combustion engine arrangement of claim 1, wherein the turbine is a variable geometry turbine.

5. The internal combustion engine arrangement of claim 1, wherein the flow control member is one of a rotating nozzle vane, an adjustable vane arranged at a turbine inlet, or a flow control valve arranged at the turbine inlet.

6. The internal combustion engine arrangement of claim 1, wherein the current operating parameter of the exhaust gas comprises an exhaust flow of the exhaust gas fed from the exhaust gas manifold to the turbine.

7. The internal combustion engine arrangement of claim 1, wherein the predetermined subset of operating conditions is formed by a predetermined set of predetermined threshold limits.

8. The internal combustion engine arrangement of claim 1, wherein the internal combustion engine arrangement further comprises a first pressure sensor arranged to detect a pressure level upstream the turbine.

9. The internal combustion engine arrangement of claim 1, wherein the internal combustion engine arrangement further comprises a second pressure sensor arranged to detect a pressure level of exhaust gas downstream the turbine.

10. The internal combustion engine arrangement of claim 1, wherein the internal combustion engine is configured to assume an engine brake operation, the processing circuitry being further configured to:
    receive a signal indicative of an engine brake operation of the internal combustion engine, and
    control the electric machine and the flow control member in response to the current operating condition forming part of the predetermined subset of operating conditions when the internal combustion engine assumes the engine brake operation.

11. The internal combustion engine arrangement of claim 1, wherein the internal combustion engine arrangement further comprises an engine aftertreatment system arranged in downstream fluid communication with the turbine, the processing circuitry being further configured to:
    receive a signal indicative of a temperature adjustment mode of the engine aftertreatment system, and
    control the electric machine and the flow control member in response to the current operating condition forming part of the predetermined subset of operating conditions when the engine aftertreatment system assumes the temperature adjustment mode.

12. The internal combustion engine arrangement of claim 11, wherein the temperature adjustment mode is a heat mode in which a temperature level of the engine aftertreatment system is increased above a predetermined threshold temperature level.

13. A vehicle, comprising the internal combustion engine arrangement of claim 1.

14. A method of controlling an internal combustion engine arrangement, the internal combustion engine arrangement comprises an internal combustion engine and a turbo arrangement, the method comprising:
    determining, by a processing circuitry, a current position of a flow control member of a turbine of the turbo arrangement and a current rotational speed of the turbo arrangement, the turbine being arranged in downstream fluid communication with an exhaust manifold of the internal combustion engine,
    determining, by the processing circuitry, a current pressure level of exhaust gas exhausted from the internal combustion engine upstream the turbine and a current expansion ratio of the exhaust gas in the turbine,
    determining, for the turbine and by the processing circuitry, a current operating condition, of a total number of operating conditions operable by the turbine, based on the current position of the flow control member, the current rotational speed of the turbo arrangement, the current pressure level of exhaust gas exhausted from the internal combustion engine upstream the turbine and a current expansion ratio of the exhaust gas in the turbine,
    obtaining, by the processing circuitry, a predetermined subset of operating conditions exposing the turbine to high cycle fatigue, and in response to the current operating condition forming part of the predetermined subset of operating conditions:
    controlling, by the processing circuitry, an electric machine, coupled to the turbine, to adjust a rotational speed of the turbo arrangement, and contemporaneously
    controlling, by the processing circuitry, a flow control member of the turbine to adjust a swallowing capacity of the turbine,
such that a subsequent operating condition of the turbine falls outside the predetermined subset of operating conditions in response to the current operating condition forming part of the predetermined subset of operating conditions.

15. A computer program product comprising program code for performing, when executed by processing circuitry, the method of claim 14.

16. A non-transitory computer-readable storage medium comprising instructions, which when executed by processing circuitry, cause the processing circuitry to perform the method of claim 14.

* * * * *